(12) United States Patent
Siefring

(10) Patent No.: US 11,473,592 B2
(45) Date of Patent: Oct. 18, 2022

(54) SYSTEMS AND METHODS FOR MANUFACTURING A SHROUDED IMPELLER

(71) Applicant: Emerson Climate Technologies, Inc., Sidney, OH (US)

(72) Inventor: Chris N. Siefring, Fort Recovery, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 91 days.

(21) Appl. No.: 16/947,680

(22) Filed: Aug. 12, 2020

(65) Prior Publication Data
US 2021/0048037 A1   Feb. 18, 2021

Related U.S. Application Data

(60) Provisional application No. 62/885,907, filed on Aug. 13, 2019.

(51) Int. Cl.
*F04D 29/42*    (2006.01)
*F04D 29/28*    (2006.01)
*F01D 5/04*     (2006.01)

(52) U.S. Cl.
CPC .......... *F04D 29/4206* (2013.01); *F01D 5/04* (2013.01); *F04D 29/284* (2013.01); *F05D 2230/237* (2013.01)

(58) Field of Classification Search
CPC ........ F04D 29/002; F04D 29/26; F04D 29/62; F04D 29/624; F04D 29/206; F04D 29/4206; F04D 29/284; F04D 29/2222; F04D 17/10; F05D 2230/237; F05D 2260/36; F05D 2260/37; B23K 2101/001; B23K 1/0018
See application file for complete search history.

(56) References Cited

U.S. PATENT DOCUMENTS 5,857,348 A     1/1999   Conry
6,146,094 A *  11/2000   Obana ................... F04D 29/281
                                                        415/200

(Continued)

FOREIGN PATENT DOCUMENTS

EP       0873809 A1      10/1998
EP       2639460 A1       9/2013
WO    WO-2021225024 A1 * 11/2021

OTHER PUBLICATIONS

International Search Report and Written Opinion issued in connection with PCT/US2020/045942 dated Nov. 16, 2020; pp. 1-18.

*Primary Examiner* — Brian P Wolcott
(74) *Attorney, Agent, or Firm* — Armstrong Teasdale LLP

(57) ABSTRACT

A method of manufacturing an impeller includes attaching blades to a hub. The impeller includes the blades, the hub, and a shroud. The blades each include a tip, and the shroud includes an inner surface and at least one ring extending from the inner surface. The method also includes applying a brazing compound to the tips of the blades and to the inner surface of the shroud. The method includes inserting the blades and the hub into the shroud such that the tips of the blades press against the rings. The rings and the tips of the blades form an interference fit between the rings and the tips of the blades that maintains a consistent gap between the shroud and the blades during manufacture of the impeller. A compressor including the impeller is also disclosed.

12 Claims, 8 Drawing Sheets

(56) References Cited

U.S. PATENT DOCUMENTS

| | | | |
|---|---|---|---|
| 6,935,555 B2* | 8/2005 | Beedon | B23K 35/3006 |
| | | | 29/889.1 |
| 7,305,762 B2* | 12/2007 | Mola | B23C 3/18 |
| | | | 29/888.024 |
| 8,650,754 B2* | 2/2014 | Niihara | F04D 29/284 |
| | | | 29/559 |
| 8,727,729 B2* | 5/2014 | Noronha | F04D 29/026 |
| | | | 416/186 R |
| 8,793,872 B2* | 8/2014 | Adachi | B29C 66/301 |
| | | | 264/405 |
| 9,091,277 B1* | 7/2015 | Young | B23P 15/04 |
| 10,385,877 B2* | 8/2019 | Kim | F04D 29/685 |
| 2013/0078099 A1* | 3/2013 | Ahn | B23K 35/025 |
| | | | 416/182 |
| 2022/0025898 A1* | 1/2022 | Okada | C22C 21/02 |

* cited by examiner

SYSTEMS AND METHODS FOR MANUFACTURING A SHROUDED IMPELLER

CROSS-REFERENCE TO RELATED APPLICATIONS

This application claims priority to U.S. Provisional Patent Application Ser. No. 62/885,907, filed on Aug. 13, 2019, the disclosure of which is hereby incorporated by reference in their entirety.

FIELD

The field of the disclosure relates generally to impellers for compressors and the like, and more particularly, to systems and methods for enabling more reliable manufacture of an impeller such as by brazing.

BACKGROUND

Typical centrifugal compressors include a compressor housing and an impeller positioned within the compressor housing. The impeller includes a hub, blades attached to the hub, and a shroud attached to the blades opposite the hub. The blades are typically cast with the hub, and the shroud is typically attached to the blades using a metal joining process such as a brazing process, a welding process, a soldering process, and/or any other metal joining process. However, the impeller will not be balanced if the shroud is not centered on the blades and the hub during the metal joining process, decreasing the efficiency of the impeller and the compressor. Additionally, an imbalanced impeller will also have increased porosity which also decreases the efficiency of the impeller and the compressor.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a method of manufacturing an impeller includes attaching a plurality of blades to a hub. The impeller includes the blades, the hub, and a shroud. The blades each include a tip, and the shroud includes an inner surface and at least one ring extending from the inner surface. The method also includes applying a brazing compound to the tips of the blades and to the inner surface of the shroud. The method further includes inserting the blades and the hub into the shroud such that the tips of the blades press against the rings. The rings and the tips of the blades form an interference fit between the rings and the tips of the blades that maintains a consistent gap between the shroud and the blades during manufacture of the impeller. The method also includes attaching the blades to the shroud using a brazing process.

In another aspect, a compressor includes a compressor housing and an impeller positioned within the compressor housing. The impeller includes a hub including a hub surface, a plurality of blades extending from the hub surface, and a shroud. The shroud includes an inner surface attached to the blades and at least one ring extending from the inner surface. The ring is configured to engage the blades when the blades and the hub are inserted into the shroud and to maintain a consistent gap between the shroud and the blades during manufacture of the impeller.

In yet another aspect, an impeller includes a hub including a hub surface, a plurality of blades extending from the hub surface, and a shroud. The shroud includes an inner surface attached to the blades and at least one ring extending from the inner surface. The ring is configured to engage the blades when the blades and the hub are inserted into the shroud and to maintain a consistent gap between the shroud and the blades during manufacture of the impeller.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the drawings.

DETAILED DESCRIPTION

Figure 1:
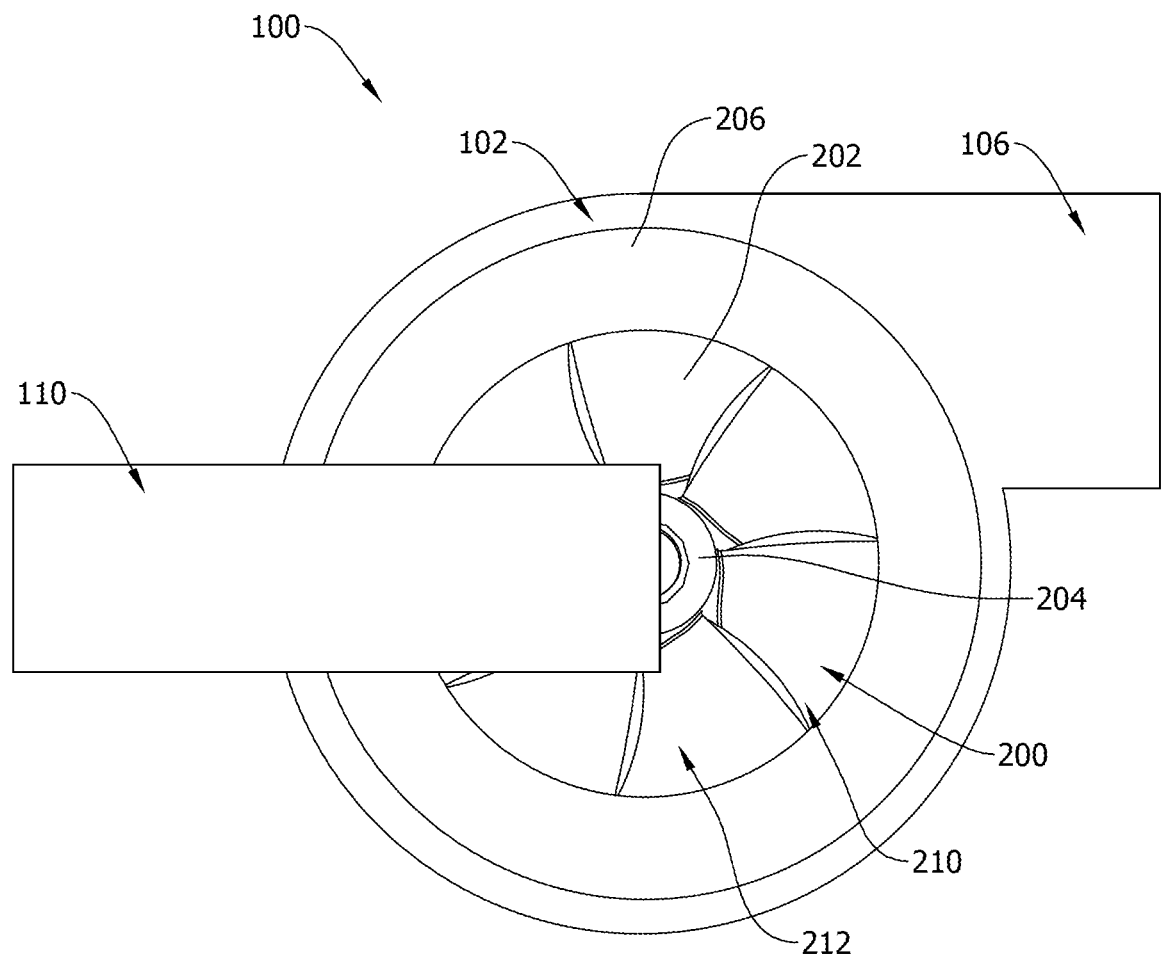
FIG. 1 is a cross-sectional schematic view of a compressor.

FIG. 1 is a cross-sectional schematic view of a compressor 100 illustrated as a single-stage centrifugal compressor. Non-limiting examples of centrifugal compressors include single-stage, two-stage, and multi-stage centrifugal compressors. In alternative embodiments, the compressor 100 may include any type of compressor that includes an impeller. The compressor 100 generally includes a compressor housing 102 forming at least one sealed cavity within which compression is accomplished. The compressor 100 includes an inlet 110 to introduce a fluid into the compressor housing 102, an outlet 106 to discharge the fluid from the compressor housing, and an impeller 200 to add kinetic energy to the fluid. The kinetic energy imparted to the fluid by the impeller 200 is converted to increased pressure (i.e. compression). The impeller 200 is connected to a driveshaft (not shown) that is operatively connected to a motor (not shown). The motor rotates the impeller 200 at a rotation speed selected to compress the fluid to a pre-selected pressure exiting the outlet 106. Any suitable motor may be operatively connected to the compressor 100 including, but not limited to, an electrical motor. The fluid may include any fluid that enables compressor 100 to operate as described herein, including, without limitation, air, refrigerant, and/or other fluids.

Figure 2:
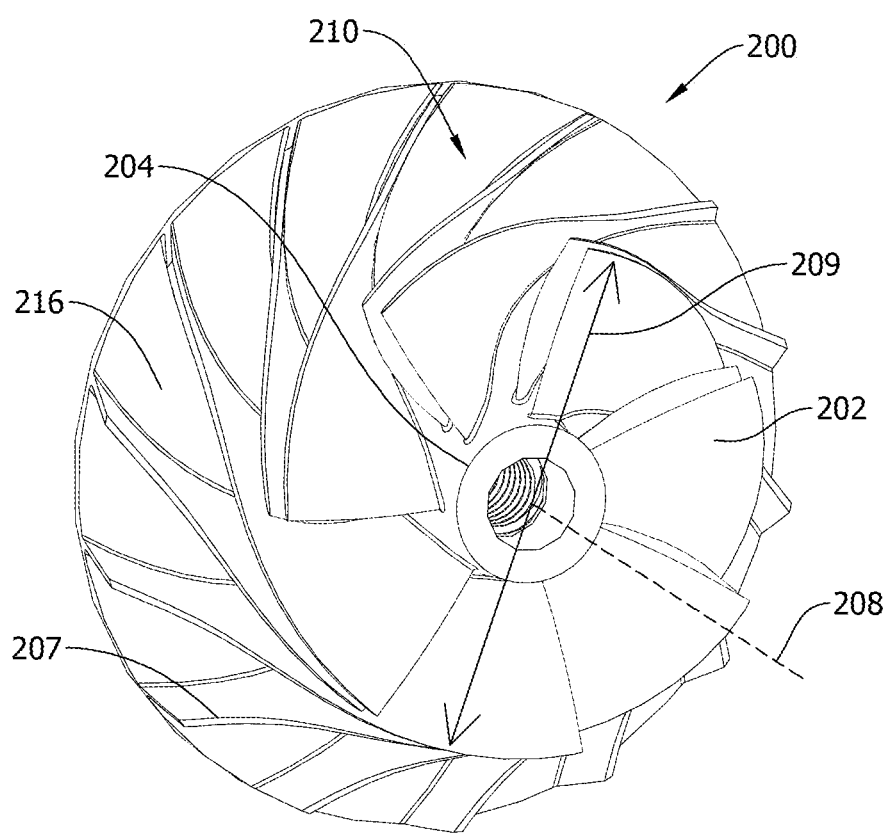
FIG. 2 is a perspective view of the impeller illustrated in FIG. 1 with a shroud removed for clarity.
Figure 3:
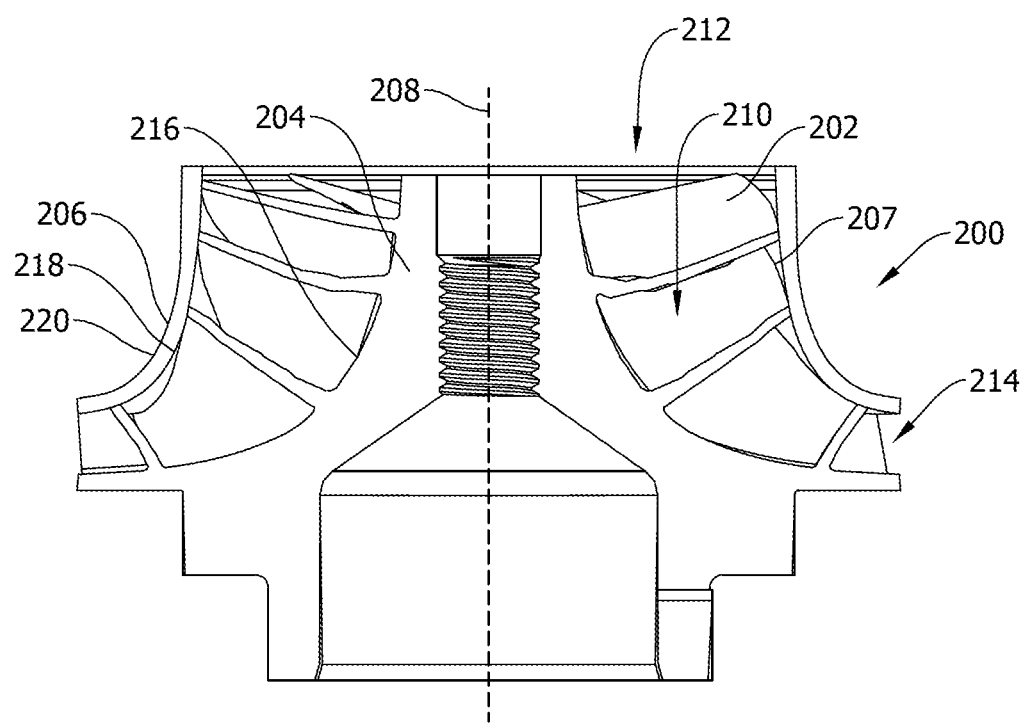
FIG. 3 is a cross-sectional view of the impeller illustrated in FIGS. 1 and 2.

FIG. 2 is a perspective view of the impeller 200 illustrated in FIG. 1 with a shroud 206 removed for clarity. FIG. 3 is a cross-sectional view of the impeller 200 illustrated in FIGS. 1 and 2. In this embodiment, the impeller 200 is configured to compress a flow of the fluid for the compressor 100 and a cooling system in which compressor 100 is incorporated, e.g., an HVAC system. The impeller 200 includes a plurality of blades 202 coupled between a hub 204 and a shroud 206. For example, the impeller 200 includes fourteen blades 202. Each blade 202 includes a tip 207 extending along a length of the blade that defines an outer diameter 209 of the blade. Alternatively, blades 202 may have any suitable blade shape, for example an airfoil blade, a backward curved blade, a forward curved blade, a perpendicular blade, and/or a radial blade that enables impeller 200 to operate as described herein. Furthermore, impeller 200 may include any number of blades 202 that enable operation as described herein. Additionally, as shown in FIG. 2, the blades 202 are helically wrapped around a hub surface 216 such that each blade forms a helical or spiral ramp around the hub surface 216. In alternative embodiments, the blades 202 may have any orientation relative to the hub surface 216 that enables the impeller 200 to operate as described herein. For example, the blades 202 may be attached to the hub surface 216 such that the blades are oriented parallel to a central axis 208.

The hub 204 and the shroud 206 of this embodiment are coaxial and configured to rotate about the center axis 208. The blades 202 are coupled to the hub 204 and/or the shroud 206 such that the blades, the hub, and the shroud define a fluid flow path 210. The blades 202, the hub 204, and the shroud 206 define an inlet 212 and an outlet 214. During rotation, the blades 202 are configured to pull in the fluid through the inlet 212 along the center axis 208 and eject the fluid radially outward through the outlet 214 defined between adjacent blades 202, the hub 204, and the shroud 206. When the impeller 200 is operating, the fluid enters through the inlet 212 and is deflected outward from the center axis 208 by the hub 204. The hub surface 216 of the hub 204 includes a bell-shaped profile, as shown in FIG. 2, which deflects the fluid radially outward from the center axis 208. The blades 202 are configured to pull the fluid through the inlet 212 and into the fluid flow path 210 where the fluid passes between the blades. The fluid flow path 210 forces the fluid outwards through the outlet 214 due to the centrifugal force generated by the rotating blades 202. More specifically, adjacent blades 202, the hub 204, and the shroud 206 define the fluid flow path 210 that is configured to accelerate the fluid through the fluid flow path 210 such that the outlet 214 ejects the fluid in a direction that is approximately perpendicular to the center axis 208.

The shroud 206 includes the inner surface 218 and an outer surface 220. As shown in FIGS. 1 and 3, the shroud 206 also includes a bell-shaped profile that complements the bell-shaped profile of the hub surface 216. More specifically, the inner surface 218 and the outer surface 220 also include a bell-shaped profile that complements the bell-shaped profile of the hub surface 216. Because of the bell-shaped profile of the hub surface 216, the inner surface 218, and the outer surface 220, the hub surface, the inner surface, and the outer surface are oriented approximately parallel to the center axis 208 proximate the inlet 212 and approximately perpendicular to the center axis proximate the outlet 214. That is, proximate the inlet 212, the inner surface 218 and the hub surface 216 are oriented such that the inner surface circumscribes the hub surface, and, proximate the outlet 214, the inner surface and the hub surface are oriented such that the inner surface is axially offset along the center axis 208 from the hub surface. Additionally, proximate the inlet 212, the blades 202 are oriented such that the inner surface 218 circumscribes the blades. The orientation of the inner surface 218 relative to the blades 202 and the hub surface 216 enables the inner surface to retain a position of the shroud 206 relative to the blades and the hub 204 during the manufacturing process.

Figure 4:
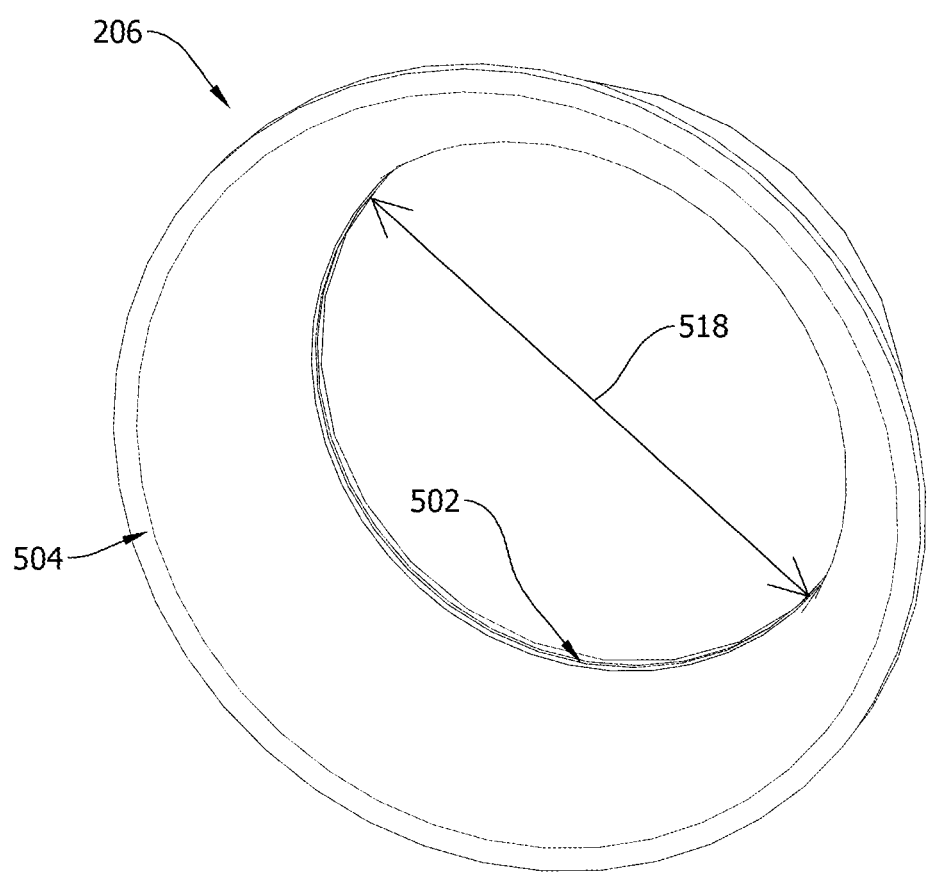
FIG. 4 is a perspective view of a shroud for use with the impeller illustrated in FIGS. 1-3.
Figure 5:
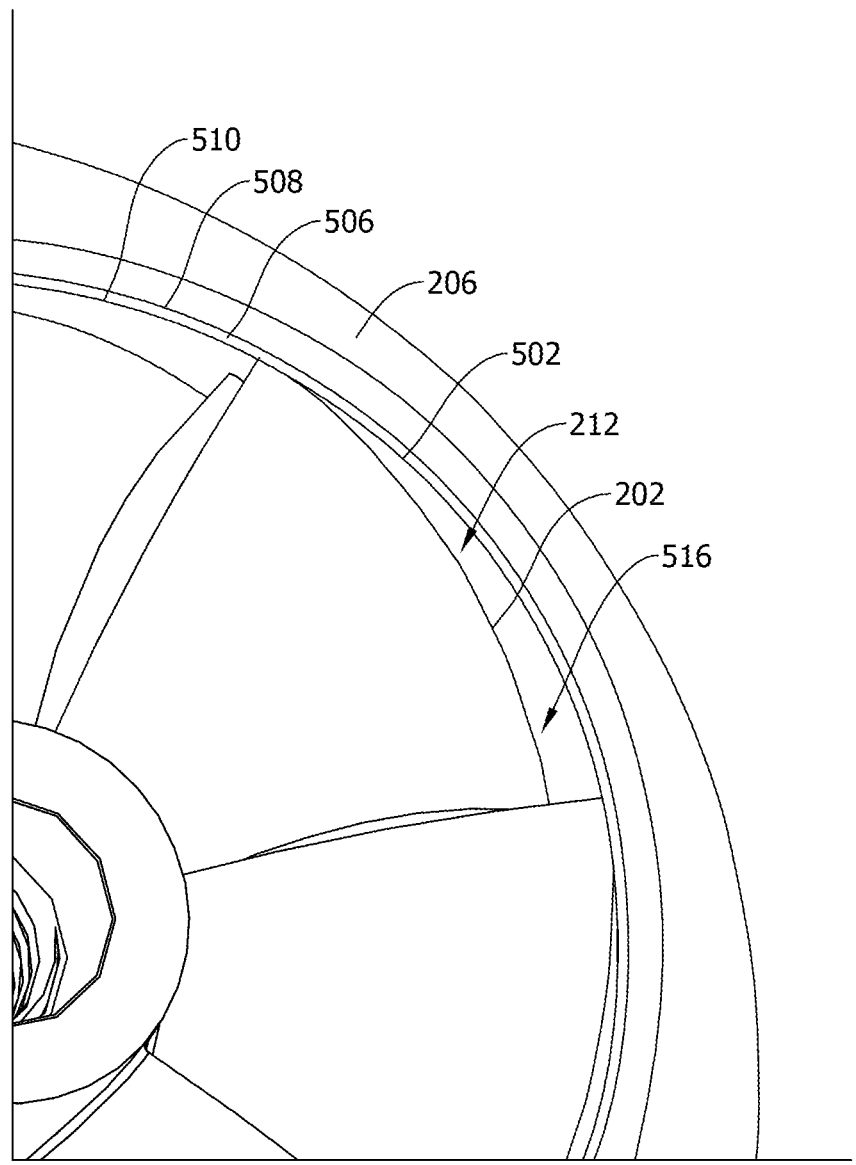
FIG. 5 is a perspective view of a portion of an inner surface of the shroud illustrated in FIG. 4.
Figure 6:
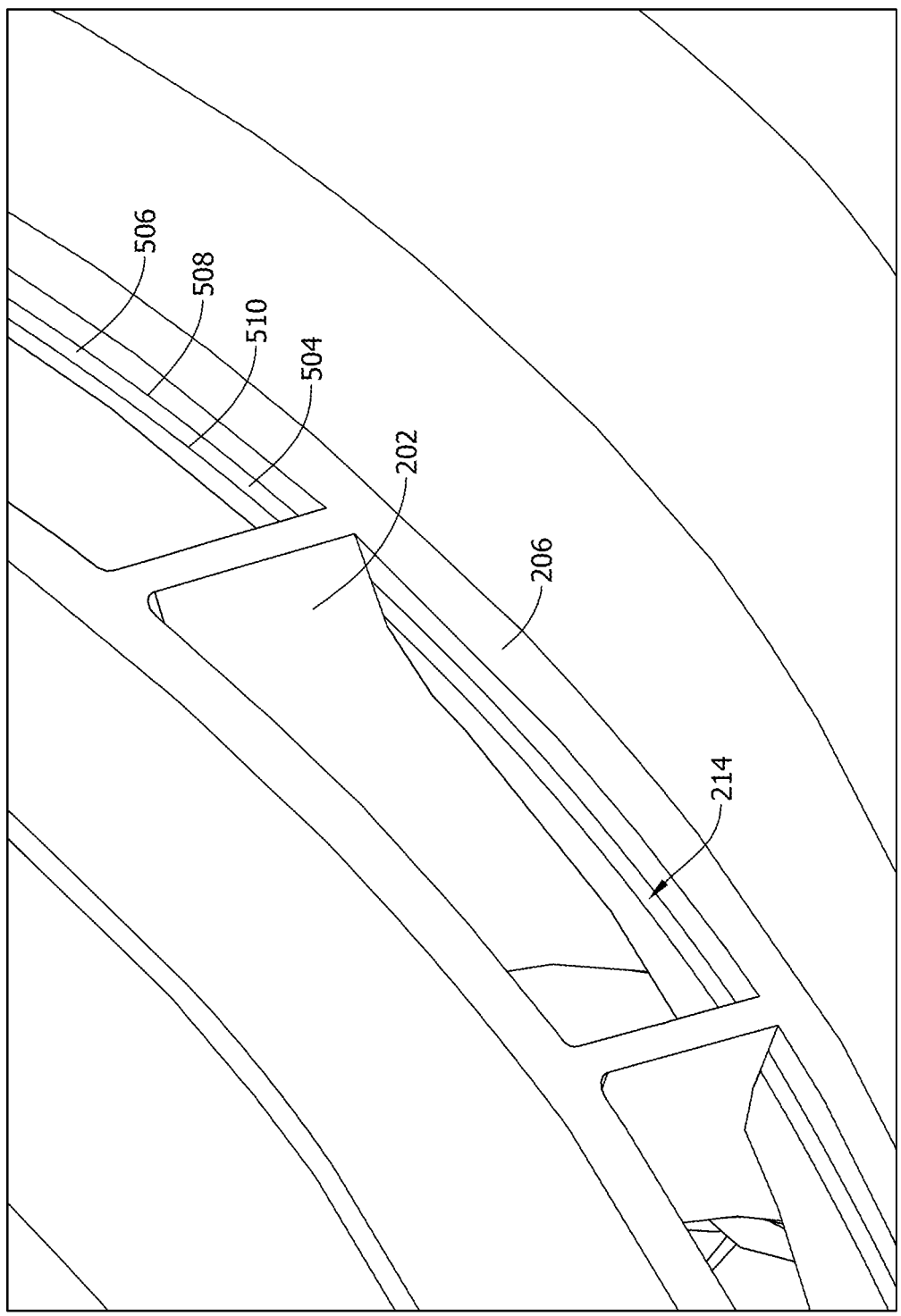
FIG. 6 is another perspective view of a portion of the inner surface of the shroud illustrated in FIG. 4.
Figure 7:
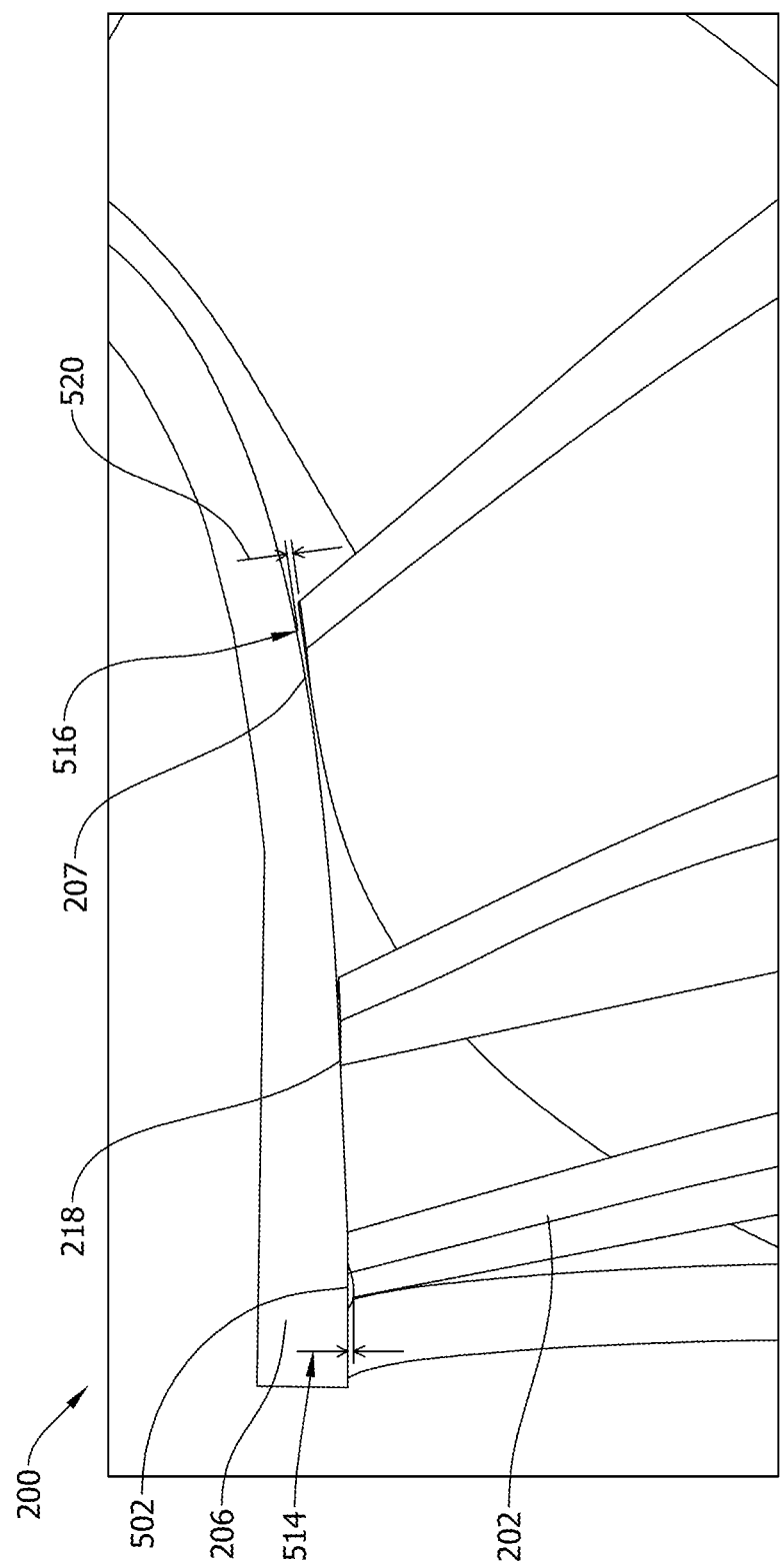
FIG. 7 is a sectional view of the impeller illustrated in FIGS. 1-6.

FIG. 4 is a perspective view of the shroud 206 illustrated in FIGS. 1-3. FIG. 5 is a perspective view of a portion of an inner surface 218 of the shroud 206 proximate the inlet 212. FIG. 6 is a perspective view of a portion of the inner surface 218 proximate the outlet 214. FIG. 7 is a sectional view of a portion of the impeller 200. The shroud 206 includes at least one protrusion 502 and 504 extending from the inner surface 218 of the shroud. The protrusions 502 and 504 of this embodiment are ring shaped. In alternative embodiments, the protrusions 502 and 504 may have any shape that enables the impeller 200 to operate as described herein. In this embodiment, the shroud 206 includes a first ring 502 positioned proximate the inlet 212 and a second ring 504 positioned proximate the outlet 214. In an alternative embodiment, the shroud 206 includes only the first ring 502. In another alternative embodiment, the shroud 206 includes only the second ring 504.

Each of the rings 502 and 504 are rounded bumps including an apex 506, a first edge 508, and a second edge 510. In an alternative embodiment, the rings 502 and 504 may have any shape that enables the rings 502 and 504 to operate as described herein. A height 514 of the rings 502 and 504 is measured from the inner surface 218 to the apex 506. In this embodiment, the height 514 is between about 0.001 inches to about 0.006 inches, or, about 0.005 inches. However, the height 514 may be any length that enables the rings 502 and 504 to operate as described herein. The first ring 502 defines an inner diameter 518 within the shroud 206. As will be discussed in greater detail below, the height 514 of the rings 502 and 504 enables the inner surface 218 and the rings to retain a position of the shroud 206 relative to the blades 202 and the hub 204 and maintain a consistent gap 516 between the shroud 206 and the blades 202 during the manufacturing process.

In this example, the blades 202 and the hub 204 are made as a single unit prior to attaching the shroud 206 to the blades. Specifically, the blades 202 and the hub 204 are made as a single unit using a casting process or a machining process, and the shroud 206 is attached to the blades using a metal joining process. Alternatively, the blades 202 and the hub 204 are made separately from each other and the blades are attached to the hub using a metal-joining process, such as, but not limited to, a brazing process, a welding process, a soldering process, and/or any other metal joining process. The shroud 206 is then attached to the blades 202 using a metal joining process, such as, but not limited to, a brazing process, a welding process, a soldering process, and/or any other metal joining process. In one embodiment, the shroud 206 is then attached to the blades 202 using a brazing process.

In order to join the shroud 206 to the blades 202, a position of the shroud relative to the blades is fixed or maintained by the rings 502 and 504 during the brazing process. Specifically, the blades 202 and the hub 204 are inserted into the shroud 206 such that the tips 207 of the blades press against the rings 502 and 504. More specifically, as the blades 202 are inserted into the inlet 212, the tips 207 of the blades engage the first ring 502 such that the first ring compresses against the tips of the blades and maintains the consistent gap 516 between the shroud 206 and the blades during the brazing process.

The first ring 502 engages the tips 207 of the blades 202 such that the first ring retains the position of the blades and the hub 204 by friction between the first ring 502 and the tips of the blades. For example, the first ring 502 and the tips 207 of the blades 202 form an interference fit, or friction fit, that retains the position of the blades and the hub 204 by friction between the first ring 502 and the tips of the blades. As used herein, an interference fit, or friction fit, is a fit between two parts in which the external dimension of one part slightly exceeds the internal dimension of the part into which it has to fit. In this embodiment, the tips 207 of the blades 202 also include a bell-shaped profile that complements the bell-shaped profile of the inner surface 218. However, the bell-shaped profile of the tips 207 of the blades 202 does not include a notch to accommodate the first ring 502. As such, the height 514 of the first ring 502 causes the outer diameter 209 of the blades 202 to exceed the inner diameter 518 of the first ring such that the first ring presses against the tips 207 of the blades. Accordingly, the height 514 of the first ring 502 enables the first ring to form an interference fit, or friction fit, with the blades 202 such that the first ring maintains the consistent gap 516 between the shroud 206 and the blades during the brazing process and maintains the position of the shroud relative to the blades and the hub 204 during the brazing process.

Moreover, as the blades 202 are inserted into the shroud 206, the tips 207 of the blades proximate the outlet 214 rest against the second ring 504 such that the second ring 504 maintains the blades and the hub 204 in position during the brazing process. The height 514 of the second ring 504 causes the second ring 504 to rest against the tips 207 of the blades 202 forming the consistent gap 516 between the tips of the blades and the shroud 206. Accordingly, the height 514 of the second ring 504 maintains the consistent gap 516 between the shroud 206 and the blades 202 and maintains the position of the shroud relative to the blades and the hub 204 during the brazing process.

The height 514 of the first and second rings 502 and 504 is selected to maintain the consistent gap 516 between the shroud 206 and the blades 202. As shown in FIG. 7, the consistent gap 516 defines a consistent gap width 520. In this embodiment, the metal-joining process determines the value of the consistent gap width 520. For example, in this embodiment, the brazing process requires a predetermined gap between the shroud 206 and the blades 202 to properly join the hub 204 and the blades to the shroud. In this embodiment, the consistent gap width 520 is between about 0.001 inches to about 0.006 inches. Because the value of the consistent gap width 520 is determined by the brazing process, the consistent gap width 520 does not scale with the size of the impeller 200. The consistent gap width 520 remains the same for all impeller 200 sizes for the brazing process. In alternative embodiments, the consistent gap width 520 may be any value that enables a metal joining process to attach the shroud 206 and the blades 202 to the hub 204 and the blades 202. Additionally, in alternative embodiments, the consistent gap width 520 may scale with the size of the impeller 200.

In this embodiment, the brazing process is a dip brazing process. In alternative embodiments, the brazing process is any other type of brazing process including, without limitation, a torch brazing process, a furnace brazing process, a silver brazing process, a braze welding process, a vacuum brazing process, and/or any other brazing process. The impeller 200 is suitably made of aluminum that may form undesirable oxides with oxygen in the air during the brazing process. The dip brazing process reduces the formation of oxides by preventing air from contacting the regions of the impeller 200 that are being joined. Specifically, the impeller 200 is dipped into a bath of molten salt that prevents air from contacting the regions of the impeller that are being joined during the dip brazing process.

Figure 8:
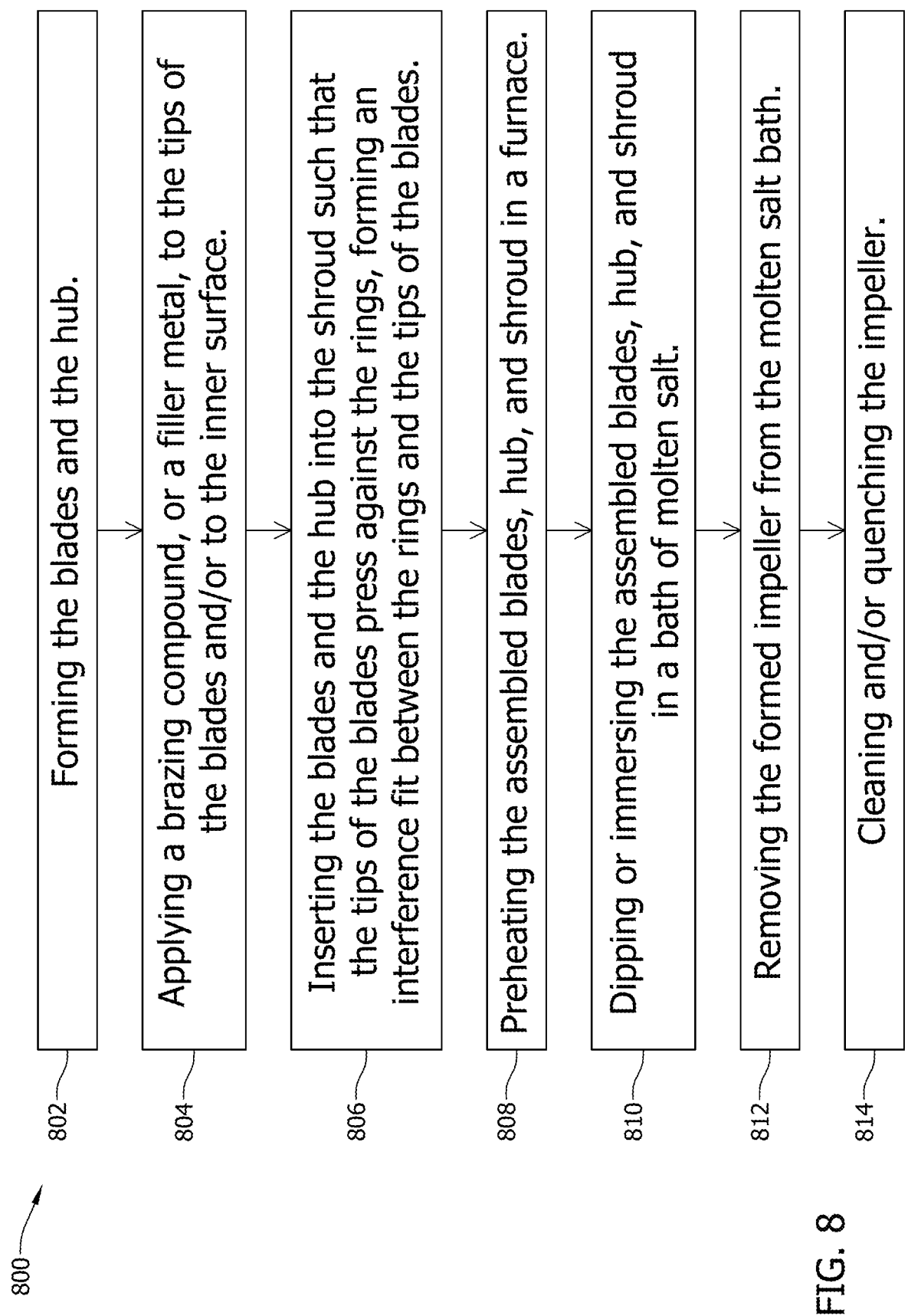
FIG. 8 is a flow diagram of a method of manufacturing the impeller illustrated in FIGS. 1-7.

FIG. 8 is a flow diagram of a method 800 of manufacturing the impeller 200. In this embodiment, the method 800 is a dip brazing process. The method 800 includes joining and/or forming 802 the blades 202 and the hub 204. As discussed above, the blades 202 and the hub 204 may be made as a single unit using a casting process, or made separately and then attached to each other using a metal joining process, such as, but not limited to, a brazing process, a welding process, a soldering process, and/or any other metal joining process. Once the blades 202 and the hub 204 have been joined together, the blades are prepared for the dip brazing process. Specifically, the method 800 includes applying 804 a brazing compound, or a filler metal, to the tips 207 of the blades 202 and/or to the inner surface 218. The brazing compound may be any mixture or compound that enables the method 800 to join the shroud 206 to the blades 202.

Once the blades 202 and the hub 204 have been joined together and the brazing compound has been applied to the tips 207 of the blades 202 and/or to the inner surface 218, the blades, and the hub 204 are inserted 806 into the shroud 206. Specifically, the blades 202 and the hub 204 are inserted 806 such that the tips 207 of the blades engage the rings 502 and 504, forming an interference fit between the rings and the tips of the blades, retaining a position of the blades and the hub 204 relative to the shroud 206, and maintaining the consistent gap 516 between the shroud and the blades. Accordingly, the rings 502 and 504 retain the position of the blades 202 and the hub 204 relative to the shroud 206 and maintain the consistent gap 516 between the shroud and the blades.

The method 800 also includes preheating 808 the assembled blades 202, hub 204, and shroud 206 in a furnace (not shown). More specifically, the assembled blades 202, hub 204, and shroud 206 are heated to a temperature between about 1,000° F. to about 1,100° F. ensure a uniform temperature throughout the assembly during the dip brazing process. The assembled blades 202, hub 204, and shroud 206 are then dipped or immersed 810 in a bath of molten salt (not shown). The molten salt acts as a flux that contacts the brazing compound, causing the brazing compound to melt and flow by capillary action into an interface between the inner surface 218 and the tips 207 of the blades 202. The molten salt may include at least one salt of beryllium, magnesium, calcium, strontium, sodium, potassium, and barium. The molten salt may also include any salt that enables the dip brazing process to join the blades 202 and the shroud 206. The method 800 further includes removing 812 the formed impeller 200 from the molten salt bath, and cleaning and/or quenching 814 the impeller 200.

The rings 502 and 504 retain a position of the blades 202 and the hub 204 relative to the shroud 206 maintain the consistent gap 516 between the shroud 206 and the blades 202 during the method 800. Specifically, the tips 207 of the blades 202 engage the rings 502 and 504, forming an interference fit between the rings and the tips of the blades, retaining a position of the blades and the hub 204 relative to the shroud 206, and maintaining the consistent gap 516 between the shroud and the blades. Accordingly, the rings 502 and 504 retain the position of the blades 202 and the hub 204 relative to the shroud 206 during the preheating 808, the immersing 810, and the removing 812 processes, enabling the impeller 200 to be brazed together in the method 800.

Impellers described include at least one ring extending from an inner surface of a shroud to maintain a consistent gap between the shroud and the blades during manufacture of the impeller. The consistent gap improves the balance of the impeller and increases the efficiency of a compressor that includes the impeller. Example impellers include a hub, a plurality of blades, and a shroud. The shroud includes at least one ring to maintain a position of the shroud relative to the blades and the hub during a metal joining process. The inclusion of the ring enables a consistent gap between the blades and the shroud to be maintained throughout the metal-joining process. More specifically, the blades and the hub are inserted into the shroud prior to the start of the metal joining process. The ring is positioned on an inner surface of the shroud, and the tips of the blades press against the ring, forming an interference fit, or friction fit, that maintains a consistent gap between the blades and the shroud throughout the metal joining process. The consistent gap may improve the balance of the impeller, increase the efficiency of a compressor that includes the impeller, and decrease the maintenance requirements of the compressor. Moreover, the consistent gap may also decrease the porosity of the brazed joint of the impeller which decreases the drag and friction of the fluid channeled through the impeller, increasing the efficiency of the compressor and decreasing the maintenance requirements of the compressor. Accordingly, the ring increases the efficiency of the compressor and decreases the maintenance requirements of the compressor.

Example systems and methods achieve better results compared to prior systems and methods. For example, unlike known impellers that include a hub, a plurality of blades, and a shroud, the shroud of the example impellers described include at least one ring to maintain a position of the shroud relative to the blades and the hub during a metal-joining process as discussed above. The inclusion of the ring enables a consistent gap between the blades and the shroud to be maintained throughout the metal joining process. More specifically, the blades and the hub are inserted into the shroud prior to the start of the metal joining process. The ring is positioned on an inner surface of the shroud, and the tips of the blades press against the ring, forming an interference fit, or friction fit, that maintains a consistent gap between the blades and the shroud throughout the metal-joining process. The consistent gap improves the balance of the impeller that increases the efficiency of a compressor that includes the impeller and decreases the maintenance requirements of the compressor. Moreover, the consistent gap also decreases the porosity of the brazed joint of the impeller which decreases the drag and friction of the fluid channeled through the impeller, increasing the efficiency of the compressor and decreasing the maintenance requirements of the compressor. Accordingly, the ring increases the efficiency of the compressor and decreases the maintenance requirements of the compressor.

Example embodiments of impellers and methods of assembling the disclosed impellers are described above in detail. The systems and methods are not limited to the specific embodiments described herein, but rather, components of the system and methods may be used independently and separately from other components described herein. For example, the impellers described herein may be used in compressors other than HVAC compressors, such as turbocharger compressors and the like.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing (s) shall be interpreted as illustrative and not in a limiting sense.

What is claimed is:

1. A compressor comprising:
a compressor housing; and
an impeller positioned within the compressor housing, the impeller comprising:
a hub including a hub surface;
a plurality of blades extending from the hub surface; and
a shroud including an inner surface attached to the plurality of blades, a first ring positioned proximate an inlet of the shroud, and a second ring positioned proximate an outlet of the shroud, each of the first and second rings extending from the inner surface, wherein the first and second rings engage the plurality of blades when the plurality of blades and the hub are inserted into the shroud.

2. The compressor of claim 1, wherein each blade includes a blade tip extending along a length of each respective blade, and the blade tip proximate the inlet engages the first ring.

3. The compressor of claim 2, wherein each blade tip proximate the outlet engages the second ring.

4. The compressor of claim 1, wherein the first ring and the second ring each include a rounded bump including an apex, a first edge, and a second edge.

5. The compressor of claim 4, wherein the first ring and the second ring each define a height between the inner surface and the apex.

6. The compressor of claim 5, wherein the height is 0.001 inches to 0.006 inches.

7. An impeller comprising:
a hub including a hub surface;
a plurality of blades extending from the hub surface; and
a shroud including an inner surface attached to the plurality of blades, a first ring positioned proximate an inlet of the shroud, and a second ring positioned proximate an outlet of the shroud, each of the first and second rings extending from the inner surface, wherein the first and second rings engage the plurality of blades when the plurality of blades and the hub are inserted into the shroud.

8. The impeller of claim 7, wherein the each blade includes a blade tip extending along a length of each respective blade, and the blade tip proximate the inlet engages the first ring.

9. The impeller of claim 8, wherein each blade tip proximate the outlet engages the second ring.

10. The impeller of claim 7, wherein the first ring and the second ring each include a rounded bump including an apex, a first edge, and a second edge.

11. The impeller of claim 10, wherein the first ring and the second ring each define a height between the inner surface and the apex.

12. The impeller of claim 11, wherein the height is 0.001 inches to 0.006 inches.

* * * * *